United States Patent
Dhopaokar et al.

(10) Patent No.: US 12,097,759 B1
(45) Date of Patent: Sep. 24, 2024

(54) DRIVE SYSTEM FOR A UTILITY VEHICLE

(71) Applicant: Omni Powertrain Technologies, LLC, Houston, TX (US)

(72) Inventors: Ajinkya Dhopaokar, Houston, TX (US); David Kemper, Houston, TX (US)

(73) Assignee: Omni Powertrain Technologies, LLC, Houston, TX (US)

( * ) Notice: Subject to any disclaimer, the term of this patent is extended or adjusted under 35 U.S.C. 154(b) by 0 days.

(21) Appl. No.: 18/365,544

(22) Filed: Aug. 4, 2023

(51) Int. Cl.
| | |
|---|---|
| *B60K 17/342* | (2006.01) |
| *B60K 1/02* | (2006.01) |
| *B60K 1/04* | (2019.01) |
| *B60K 17/04* | (2006.01) |
| *B60K 17/354* | (2006.01) |
| *B60K 17/356* | (2006.01) |
| *F16H 37/06* | (2006.01) |

(52) U.S. Cl.
CPC ............ *B60K 17/342* (2013.01); *B60K 1/02* (2013.01); *B60K 1/04* (2013.01); *B60K 17/04* (2013.01); *B60K 17/354* (2013.01); *B60K 17/356* (2013.01); *F16H 37/065* (2013.01); *B60K 2001/0405* (2013.01)

(58) Field of Classification Search
CPC .......... B60K 17/342; B60K 1/02; B60K 1/04; B60K 17/04; B60K 17/354; B60K 17/356; F16H 37/065
See application file for complete search history.

(56) References Cited

U.S. PATENT DOCUMENTS

| | | | | |
|---|---|---|---|---|
| 3,895,728 | A * | 7/1975 | Heggen | B60D 1/50 180/89.12 |
| 4,562,893 | A * | 1/1986 | Cunard | B60L 50/52 180/22 |
| 4,962,821 | A * | 10/1990 | Kim | E02F 9/202 180/242 |
| 5,480,003 | A * | 1/1996 | Hill | F16C 17/045 184/6.12 |

(Continued)

FOREIGN PATENT DOCUMENTS

| | | | | |
|---|---|---|---|---|
| EP | 2883737 A1 * | 6/2015 | ............. | B60K 17/16 |
| WO | WO-2008003987 A2 * | 1/2008 | ........... | B60K 17/356 |

*Primary Examiner* — Jacob D Knutson
(74) *Attorney, Agent, or Firm* — Haynes and Boone, LLP

(57) ABSTRACT

A utility vehicle having a chassis frame extending along a centerline axis where the chassis frame includes a first side frame member and a second side frame member opposing one another about the centerline axis. A first drive mechanism is supported by the first frame member, and a second drive mechanism is supported by the second frame member. A first gearset assembly is coupled to the first drive mechanism, and a second gearset assembly is coupled to the second drive mechanism. A first axial flux electric motor is coupled to the first gearset and positioned between the first frame member and the first gearset, and a second axial flux electric motor is coupled to the second gearset and positioned between the second frame member and the second gearset. The first gearset and the second gearset are spaced apart from one another on opposite sides of the centerline axis thereby permitting each gearset assembly to be readily installed and maintained without interfering with the opposing gearset assembly.

18 Claims, 6 Drawing Sheets

(56) References Cited

U.S. PATENT DOCUMENTS

| | | | |
|---|---|---|---|
| 6,488,110 B2 * | 12/2002 | Price | B60G 7/04 |
| | | | 180/251 |
| 6,968,913 B1 * | 11/2005 | Priepke | E02F 9/02 |
| | | | 180/6.24 |
| 7,954,574 B2 * | 6/2011 | Schoon | E02F 9/207 |
| | | | 180/6.48 |
| 2008/0230289 A1 * | 9/2008 | Schoon | B60K 1/02 |
| | | | 180/65.6 |
| 2011/0011656 A1 * | 1/2011 | Poulsen | B60L 50/16 |
| | | | 903/909 |
| 2020/0381972 A1 * | 12/2020 | Momen | H02K 3/42 |

* cited by examiner

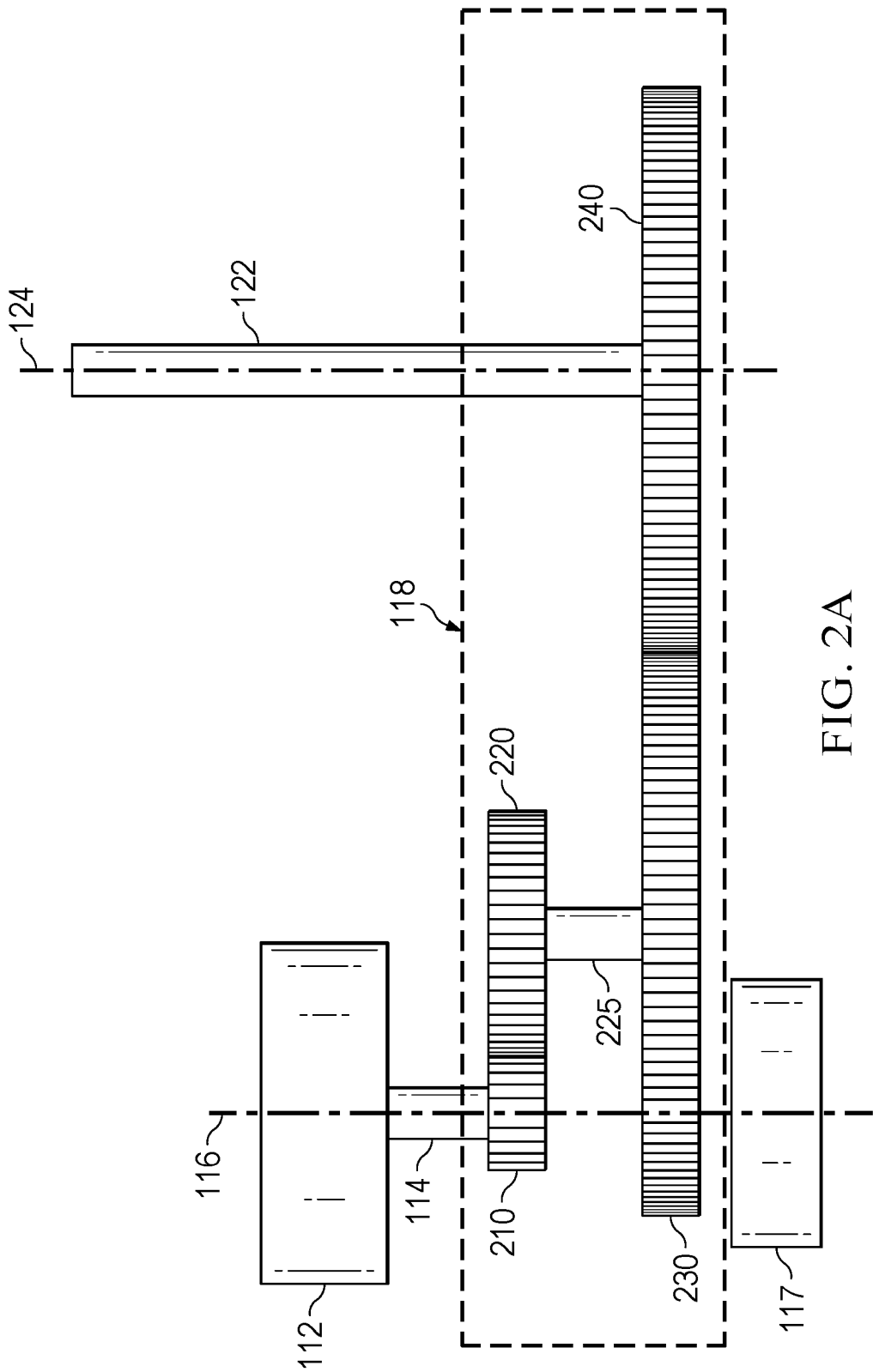

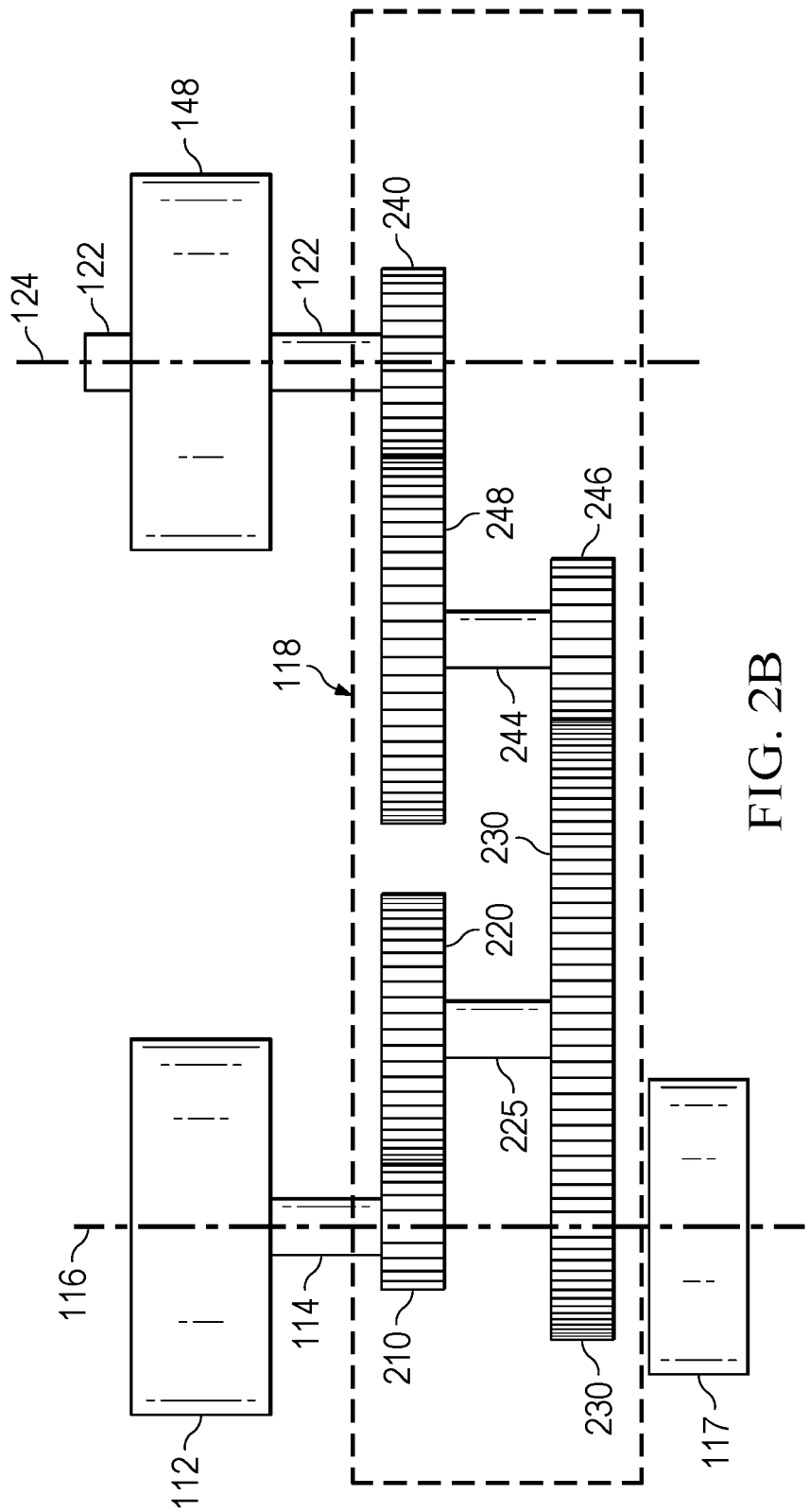

DRIVE SYSTEM FOR A UTILITY VEHICLE

FIELD

The disclosure relates to the field of utility vehicles, and in particular drive systems for electrically powered utility vehicles.

BACKGROUND

Existing drive systems for utility vehicles may include two centrally located motors positioned adjacent one another on a frame with each motor disposed to drive a set of wheels on opposing sides of the frame. Typically, planetary gearsets are utilized to achieve a desired gear reduction in order to drive the wheel sets. Moreover, it is known to position the two motors adjacent one another so that output drive shafts of the planetary gearsets are aligned along a shared axis at the middle of the frame in order to minimize the size of the drive train components so as to maximize the space available for batteries and controls. One drawback to such prior art arrangements is that the motor and gearing configuration renders installation, repair, and replacement of the motors difficult given the limited access space about the motors. In addition, given these space restraints, such systems do not lend themselves to ready replacement of motors with higher power motors having increased external dimensions.

BRIEF DESCRIPTIONS OF THE DRAWINGS

FIG. 2A illustrates a gearset assembly coupled to a motor according to some embodiments.

FIG. 2B illustrates a gearset assembly coupled to a motor according to some embodiments.

Figure 1A:
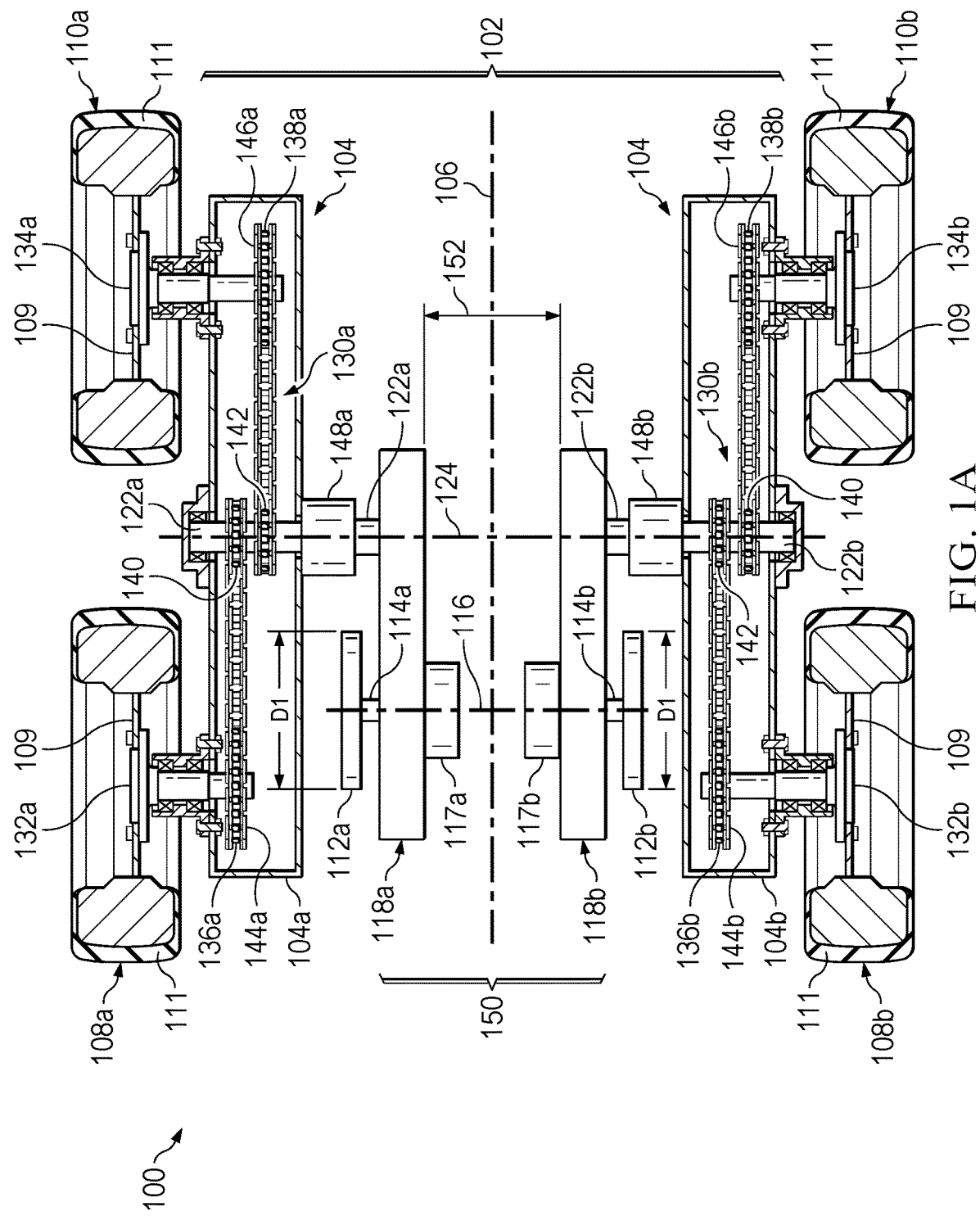
FIG. 1A is a top plan view of a utility vehicle including two axial flux electric motors positioned between respective gearset assemblies and respective side frame members according to some embodiments.

Various embodiments described herein and their advantages are described in the detailed description that follows. It should be appreciated that like reference numerals are used to identify like elements illustrated in the figure for purposes of illustrating but not limiting the various embodiments described herein.

DETAILED DESCRIPTION

Disclosed herein is an electric drive train system for a utility vehicle. The electric drive train system includes two axial flux electric motors, where each axial flux electric motor is disposed to drive the forward and rear wheels on a side of the utility vehicle. The axial flux electric motors are arranged on a vehicle chassis frame to be opposing but spaced apart from one another so as to define an access space between the opposing axial flux electric motors. In one or more first embodiments, each axial flux electric motor includes a driveshaft extending inwardly towards the opposing axial flux electric motor, where the driveshafts of the two axial flux electric motors may be aligned along a shared axis. In such first embodiments, each inwardly extending driveshaft is coupled to a separate parallel shaft gearset assembly, where each parallel shaft gearset assembly may be positioned in the access space so as to be opposing but spaced apart from one another between the axial flux electric motors. In some embodiments, one or more electric batteries may be positioned in the access space between opposing parallel shaft gearset assemblies. Each parallel shaft gearset assembly includes an output shaft extending in a direction opposite the direction of the axial flux electric motor drive shaft to which it is coupled. In one or more embodiments, each output shaft of a parallel shaft gearset assembly is coupled to a chain drive mechanism which is in turn coupled to the forward wheel and the rear wheel of a side of the utility vehicle. The vehicle chassis frame extends along a centerline axis, where the chassis frame has opposing sides with a forward wheel and a rear wheel disposed on each side of the chassis frame. In some embodiments, the output shafts of the parallel shaft gearset assemblies may extend in opposite directions along the same output shaft axis. In some embodiments, the output shaft of a parallel shaft gearset assembly may be equidistant between the forward wheel and the rear wheel to which it is coupled. A brake assembly may be disposed along an output shaft coupled to the chain drive assembly. Likewise, a planetary gearset assembly may be disposed along an output shaft of a parallel shaft gearset assembly.

In one or more second embodiments, two electric drive motors are provided and spaced apart from one another longitudinally along a centerline axis of a utility vehicle chassis frame. Each drive motor is disposed to drive the forward and rear wheels on a side of the utility vehicle. Each drive motor includes a driveshaft extending outwards and engaged with a parallel shaft gearset assembly disposed along a respective side of the utility vehicle frame. Each parallel shaft gearset assembly includes an output shaft coupled to a chain drive mechanism which is in turn coupled to a forward wheel and a rear wheel. A brake assembly may be disposed along an output shaft coupled to the chain drive assembly. The parallel shaft gearset assembly as arranged in this second embodiment allows desired gear reductions to be achieved while minimizing the depth of the gearbox, thereby increasing the available lateral space for electric drive motors between the sides of the vehicle chassis frame. Because the motors are spaced apart longitudinally from one another, the access space therebetween can be utilized for batteries.

FIG. 1A is a top plan view of a utility vehicle 100 having an electric drive train system 102 supported on a vehicle chassis frame 104 extending along a centerline axis 106. Vehicle chassis frame 104 includes opposing side frame members 104a, 104b. In one or more embodiments, each side frame member 104a, 104b includes at least a forward wheel assembly 108a, 108b, respectively, and a rear wheel assembly 110a, 110b, respectively. The electric drive train system 102 includes two axial flux electric motors 112, namely a first axial flux electric motor 112a and a second axial flux electric motor 112b. Although not limited to a particular electric motor in some embodiments, in other embodiments, the axial flux electric motors 112a, 112b are alternating current motors. Although not limited to a particular type of axial flux electric motor, in one embodiment, one or more axial flux electric motor 112a, 112b may have two stators with a single rotor disposed therebetween so as to have a stator-rotor-stator arrangement. In other embodiments, one or more axial flux electric motor 112a, 112b may have two rotors with a single stator disposed therebetween so as to have a rotor-stator-rotor arrangement In any event, the two axial flux electric motors 112a, 112b are carried by vehicle chassis frame 104 so as to oppose one another on opposite sides of centerline axis 106, but where the first axial flux electric motor 112a is spaced apart from the second axial flux electric motor 112b on opposite sides of centerline axis 106. Moreover, each axial flux electric motor 112a, 112b includes a respective driveshaft 114a, 114b that extends inward from each respective axial flux electric motor 112a, 112b towards centerline axis 106. In some embodiments, the driveshafts 114a, 114b of the respective axial flux electric motors 112a, 112b extend towards one another along the same driveshaft axis 116 such that driveshaft 114a is coaxial with the driveshaft 114b.

The utility vehicle 100 further includes two parallel shaft gearset assemblies 118a, 118b, where the gearset assemblies 118a, 118b are likewise disposed on opposing sides of a centerline axis 106. Each gearset assembly 118a, 118b is coupled to a separate axial flux electric motor 112a, 112b, respectively. Moreover, each gearset assembly 118a, 118b is positioned inward of its respective axial flux electric motor 112a, 112b so that each gearset assembly 118a, 118b is positioned between the axial flux electric motor 112a, 112b to which it is coupled and the centerline axis 106. Each gearset assembly 118a, 118b includes a respective output shaft 122a, 122b extending outward away from the centerline axis 106. In one or more embodiments, the output shafts 122a, 122b of both gearset assemblies 118a, 118b are aligned along the same output shaft axis 124.

As shown in FIG. 1A, each axial flux electric motor 112a, 112b is coupled to a respective gearset assembly 118a, 118b via a respective driveshaft 114a, 114b of each respective axial flux electric motor 112a, 112b. Thus, axial flux electric motor 112a having driveshaft 114a is coupled to gearset assembly 118a, and axial flux electric motor 112b having driveshaft 114b is coupled to gearset assembly 118b. Gearset assembly 118a in turn drives an output shaft 122a, which is used to rotate wheel assemblies 108a, 10a of the utility vehicle 100, and gearset assembly 118b in turn drives an output shaft 122b which is used to rotate wheel assemblies 108b, 110b of utility vehicle 100. As shown, output shafts 122a and 122b each extend outward from their respective gearset assemblies 118a, 118b, away from centerline axis 106, such that they extend in a direction opposite the driveshafts 114a, 114b to which they are coupled.

Forward wheel assembly 108a includes a wheel hub 109 on which is mounted a wheel 111, while rear wheel assembly 110a includes a wheel hub 109 on which is mounted a wheel 11. Disposed along each side frame member 104a, 104b is a respective drive mechanism 130a, 130b. Each drive mechanism 130a, 130b includes a respective first wheel shaft 132a, 132b and a respective second wheel shaft 134a, 134b, where first wheel shafts 132a, 132b are respectively coupled to the wheel hubs 109 of the forward wheel assemblies 108a, 108b, and second wheel shafts 134a, 134b are respectively coupled to the wheel hub 109 of the rear wheel assemblies 110a, 110b. In one or more embodiments, a forward wheel sprocket 136a, 136b is formed as part of the wheel shafts 132a, 132b, respectively, or alternatively is separately affixed or attached to the wheel shafts 132a, 132b, respectively, for driving respective forward wheel assemblies 108a, 108b. Likewise, a rear wheel sprocket 138a, 138b is formed as part of wheel shafts 134a, 134b, respectively, or alternatively is separately affixed or attached to the wheel shafts 134a, 134b, respectively, for driving respective rear wheel assemblies 110a, 110b.

While wheel assemblies 108a, 108b, 110a, 11b have been described with wheels 111, in other embodiments, each wheel assembly may be a continuous track system having a continuous band of treads or track plates driven by two or more wheels or sprockets.

Each drive mechanism 130a, 130b also includes a first output sprocket 140 and a second output sprocket 142, which output sprockets 140, 142 are mounted on a respective output shaft 122a, 122b coupled to a respective gearset assembly 118a, 118b. The output sprockets 140, 142 may be an integral part of the respective output shafts 122a, 122b or they may be separately attached to the respective output shafts 122a, 122b.

Finally, each drive mechanism 130a, 130b also includes a respective forward chain 144a, 144b and a respective rear chain 146a, 146b. Forward chains 144a, 144b engage respective forward wheel sprockets 136a, 136b and 140a, 140b and communicate horsepower and torque to respective forward wheel assemblies 108a, 108b. Rear chains 146a, 146b engage respective rear wheel sprockets 138a, 138b and 142a, 142b and communicate horsepower and torque to respective rear wheel assemblies 110a, 110b.

As used herein, sprocket refers to any wheel with cogs and chain may include any loop formed of links as well as any smooth or cogged belts or other flexible looped mechanism.

In one or more embodiments, a regulator assembly 148a, 148b may be disposed along the output shaft 122a, 122b, respectively, extending from respective gearset assemblies 118a, 118b. In some embodiments, the regulator assemblies 148a, 148b may be integrally formed with or alternatively coupled to the output shaft 122a, 122b, respectively. In one or more embodiments, regulator assemblies 148a, 148b may be a brake as is well known in the art, which may include an electric brake, a hydraulic brake or a mechanical brake. In other embodiments, regulator assemblies 148a, 148b may be a planetary gearset.

As discussed above, each axial flux electric motor 112a, 112b is positioned between a respective gearset assembly 118a, 118b and its respective side frame member 104a, 104b. By positioning the axial flux electric motors 112a, 112b at an outward location relative to centerline axis 106 with their respective driveshafts 114a, 114b extending back towards centerline axis 106, an access space 150 between the axial flux electric motors 112a, 112b is formed. The access space 150 allows the gearset assemblies 118a, 118b to be more readily installed during manufacture of the utility vehicle 100, and allows the gearset assemblies 118a, 118b to be more readily accessed for maintenance. Additionally, when installed the gearset assemblies 118a, 118b are also spaced apart by a gap 152. As shown in FIG. 1A, the gap 152 spans across the centerline axis 106 of the utility vehicle 100. Because the utility vehicle 100 includes the gap 152 between the gearset assemblies 118a, 118b, the electric drive train system 102 of the utility vehicle 100 may be more easily manufactured. The gap 152 allows for tools (e.g., drills, wrenches, etc.) or people to access the interior of the utility vehicle 100 when installing or maintaining the components of the electric drive train system 102 of the utility vehicle 100. For example, gearset assemblies 118a, 118b may be inserted into the access space 150 of utility vehicle 100 without interfering with one another.

Figure 1B:
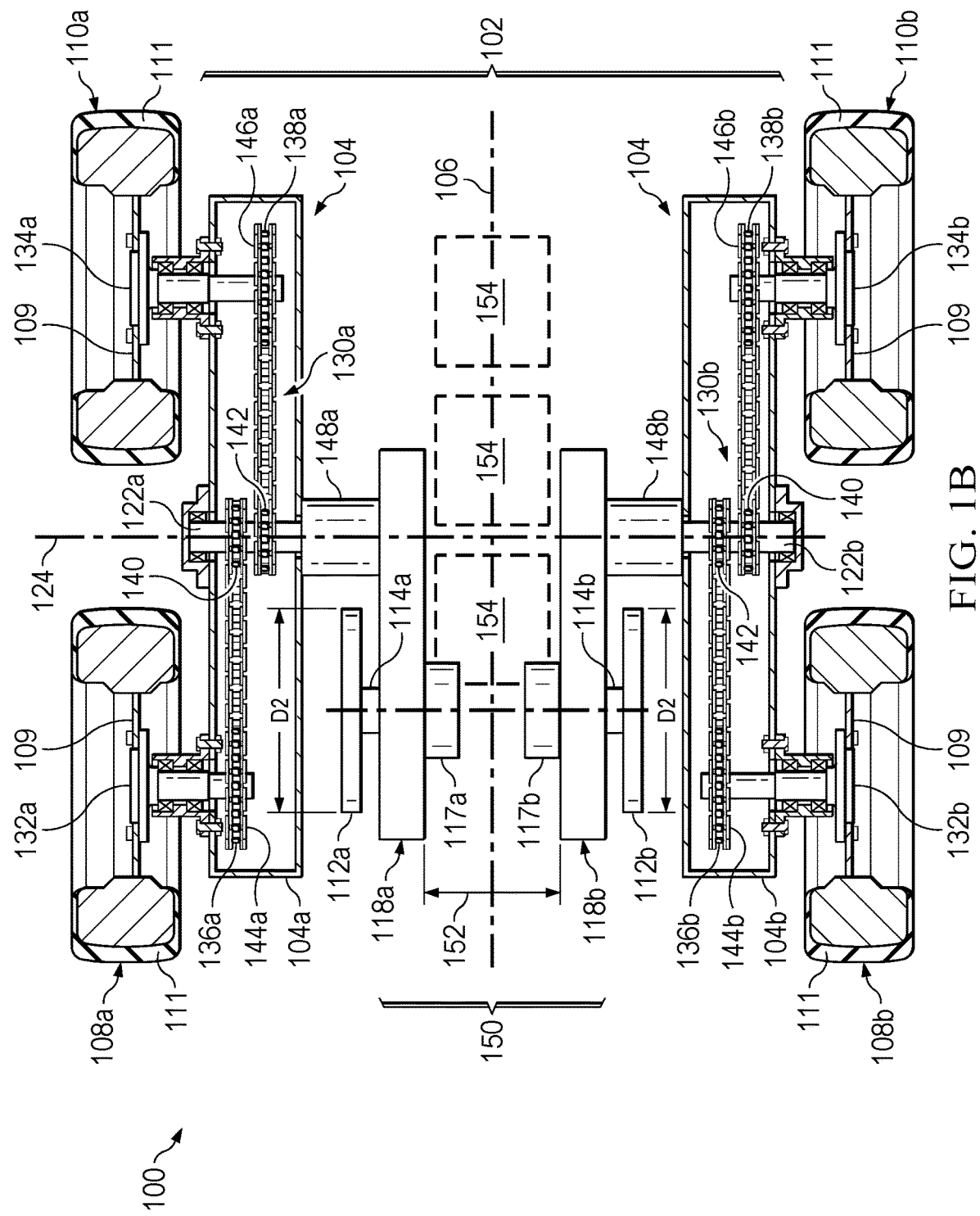
FIG. 1B is a top plan view of a utility vehicle including two axial flux electric motors positioned between respective gearset assemblies and respective side frame members according to some embodiments.

As is best seen in FIG. 1B, in one or more embodiments, one or more batteries 154 may be installed in the gap 152 between gearset assemblies 118a, 118b. The opposing gearset assemblies 118a, 118b, being spaced apart from one another to form gap 152, provide sufficient space for batteries 154 to be installed along centerline axis 106.

As noted above, in one or more embodiments, output shafts 122a, 122b are aligned along output shaft axis 124. Moreover, in some embodiments, output shaft axis 124 is arranged to be approximately equidistant between wheel shafts 132a, 134a and approximately equidistant between wheel shafts 132b, 134b. As such, aligning the output shafts 122a, 122b may allow for the weight distribution of the utility vehicle 100 to be more evenly balanced. Balancing the weight distribution of the components of the utility vehicle 100 may result in a more even torque distribution to the wheel assemblies 108a, 108b, 110a, 110b. In this regard, in those embodiments where batteries 154 are installed in the gap 152 between opposing gearset assemblies 118a, 118b, the position of the batteries 154 may likewise be specifically selected to achieve a desired weight distribution. In some embodiments, the batteries 154 may be symmetrically deployed about output shaft axis 124 thus evenly distributing the weight of batteries 154 about output shaft axis 124. In other embodiments, as desired, the batteries 154 may be positioned forward or rearward of output shaft axis 124 to achieve a particular weigh distribution. For example, in the illustrated embodiment, the axial flux electric motors 112a, 112b, and gearset assemblies 118a, 118b are positioned primarily forward of output shaft axis 124, and the batteries 154 are positioned so that their collective weight is primarily rearward of output shaft axis 124.

Notably, where output shafts 122a, 122b may each be placed at the center of their respective side frame members 104a, 104b, the lengths of the chains 144a, 146a, 144b, 146b may be the same. This allows for the drive system to be more easily assembled because any one of the four chains 144a, 146a, 144b, 146b, can be used in any of the four locations where the chains are to be located.

The power output of an axial flux motor increases as a diameter of the axial flux motor increases. For example, as shown in FIG. 1A, the axial flux electric motors 112a, 112b each have a diameter D1. FIG. 1B illustrates axial flux electric motors 112a, 112b each having a diameter D2. The diameter D2 is greater than the diameter D1. Therefore, the axial flux electric motors 112a, 112b shown in FIG. 1B output more power than the axial flux electric motors 112a, 112b shown in FIG. 1A. While the diameters of the axial flux electric motors 112a, 112b may change, the axial thickness of the motors may remain the same, thereby permitting the motors to be arranged as described above while permitting flexibility to change the power output of the motors. For example, the axial flux electric motors 112a, 112b of FIG. 1A have the same axial thickness as the axial flux electric motors 112a, 112b of FIG. 1B. Therefore, the power output of the motors may be increased by increasing the diameter of the motors without increasing the axial thickness of the motors or encroaching on the access space 150. This allows for more powerful motors to be installed in the utility vehicle 100 without reducing the space provided by the gap 152 between the gearset assemblies 118a, 118b.

Although axial flux electric motors 112a, 112b, as well as gearset assemblies 118a, 118b are show as opposing or mirroring one another across centerline axis 106 in order to define gap 152 therebetween, it will be appreciated that in other embodiments, one axial flux electric motor, such as axial flux electric motor 112a, may be forward of output shaft axis 124, and one axial flux electric motor, such as axial flux electric motor 112b, may be rearward of output shaft axis 124, whereby the access space 150 is maintained, and thereby allowing the gap 152 between gearset assemblies 118a, 118b to be established. It will be appreciated that in such case, driveshafts 114a, 114b do not extend along the same axis, but in any case, each driveshaft 114a, 114b still extends inward towards centerline axis 106.

In one or more embodiments, a brake 117 may be disposed to control rotation of driveshaft 114. In some embodiments, brake 117 is disposed along driveshaft axis 116. In some embodiments, brake 117 is mounted on gearbox assembly 118 opposite the axial flux electric motor 112. Thus, in FIGS. 1A and 1B, brake 117a is shown mounted on gearbox assembly 118a opposite axial flux electric motor 112a, and brake 117b is shown mounted on gearbox assembly 118b opposite axial flux electric motor 112b along driveshaft axis 116. Although not limited to a type of brake, in one or more embodiments, brake 117 may be an electromagnetic brake. In still other embodiments, brake 117 may be a hydraulic brake.

FIGS. 2A and 2B illustrate exemplary configurations of a gearset assembly 118. The gearset assembly 118 may represent one or both of gearset assemblies 118a, 18b. The gearset assembly 118 shown in FIGS. 2A and 2B is a parallel shaft gearset assembly. In that regard, the driveshaft 114 (e.g., driveshaft 114a, 114b) of the axial flux electric motor 112 (e.g., axial flux electric motor 112a, 112b) is parallel or substantially parallel with the output shaft 122 (e.g., the output shaft 122a, 122b), as well as any intermediate shafts coupled thereto. In FIG. 2A, the gearset assembly 118 includes an input gear 210 mounted on the driveshaft 114 and meshed with a first intermediate gear 220. First intermediate gear 220 is mounted on a first intermediate driveshaft 225, on which is also mounted a second intermediate gear 230 so that actuation of axial flux electric motor 112 results in rotation of second intermediate gears 230. Meshed with second intermediate gear 230 is an output gear 240 mounted on output shaft 122 extending along output shaft axis 124. Any one or more of the gears 210, 220, 230, 240 may be spur gears or alternatively may be any other type of gear, such as a helical gear, a planetary gear or gear set, a worm gear, a bevel gear, etc. In one or more embodiments, the output gear 240 may be a planetary gear set. In one or more embodiments, gears 230 and 240 may be the same diameter, which is larger than the diameters of gears 210 and 220, as illustrated. FIG. 2B is similar to FIG. 2A, but includes an additional intermediate driveshaft 244 with additional intervening intermediate gears 246 and 248 mounted thereon, wherein additional intermediate driveshaft 244 is parallel with shafts 114, 225, and 122. In one or more embodiments, gears 248 may be larger in diameter than gear 240, and gear 230 may be larger in diameter than gear 246, as illustrated. Notwithstanding the foregoing, it will be appreciated that in other embodiments, gear diameters may be selected to achieve a desired gearing ratio for driving output shaft 122.

In FIG. 2B, a regulator assembly 148 (e.g., regulator assembly 148a, 148b) may be disposed along output shaft 122. In one or more embodiments, regulator assembly 148 may be a brake, while in other embodiments, regulator assembly 148 may be a planetary gearset.

Although not required, in some embodiments, such as is shown in FIGS. 2A and 2B, a brake 117 may be disposed to control rotation of driveshaft 114. In some embodiments, brake 117 is disposed along driveshaft axis 116. In some embodiments, brake 117 is mounted on gearbox assembly 118 opposite the axial flux electric motor 112.

Figure 3A:
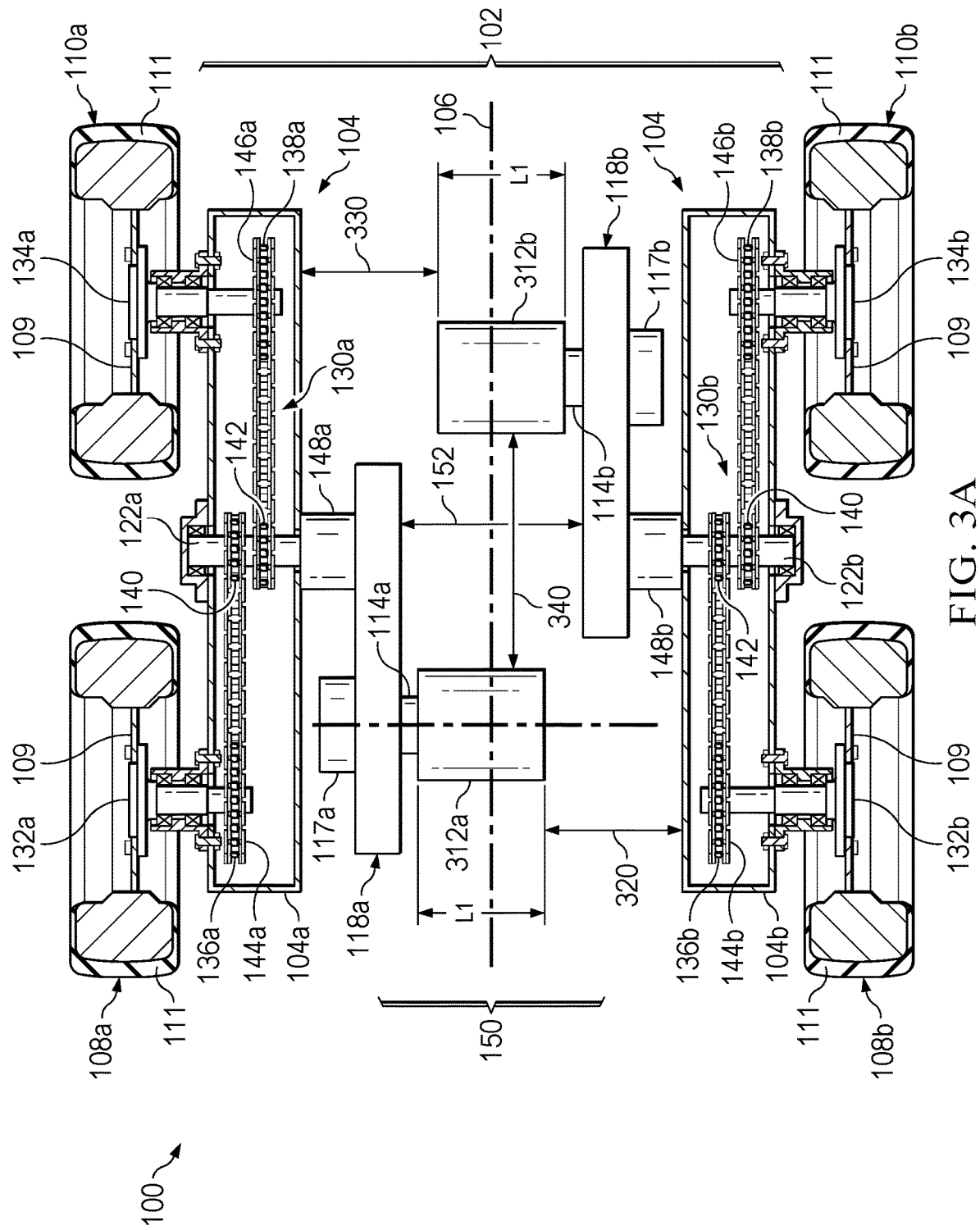
FIG. 3A is a top plan view of a utility vehicle including two radial flux electric motors spaced apart by a gap according to some embodiments.
Figure 3B:
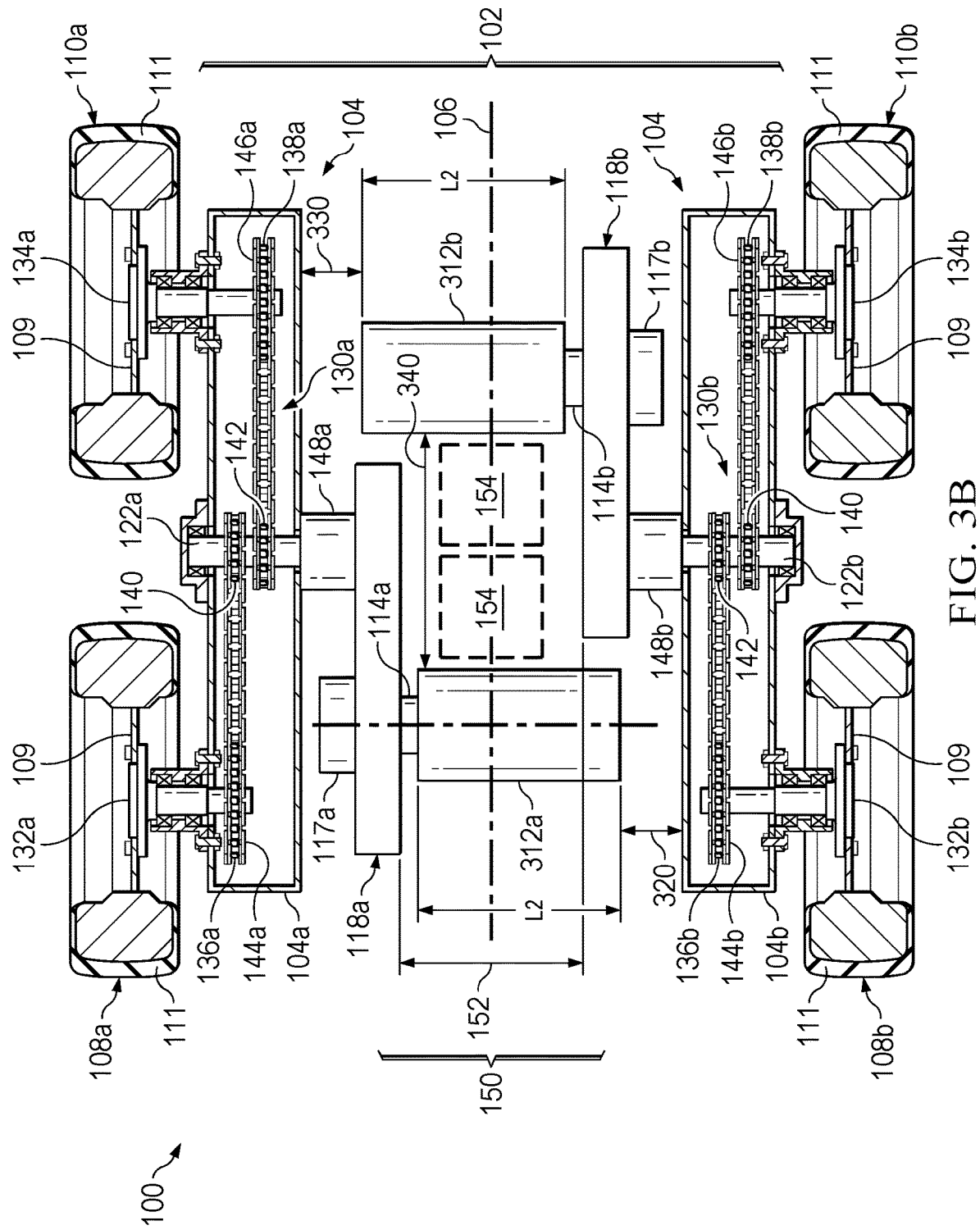
FIG. 3B is a top plan view of a utility vehicle including two radial flux electric motors spaced apart by a gap according to some embodiments.

Turning to FIGS. 3A and 3B, other embodiments of a utility vehicle 100 are illustrated, wherein radial flux electric motors 312a, 312b are utilized to power utility vehicle 100. Although not limited to a particular electric motor in some embodiments, in other embodiments, the radial flux electric motors 312a, 312b are alternating current motors. As shown in FIG. 3A, the radial flux electric motors 312a, 312b are in a spaced apart, staggered configuration along centerline axis 106 so as to provide the access space 150 and gap 152 along centerline axis 106. The radial flux electric motor 312a is positioned at the forward end of the utility vehicle 100, and the radial flux electric motor 312b is positioned at the rear end of the utility vehicle 100. Each radial flux electric motor 312a, 312b is coupled to a respective gearset assembly 118a, 118b via a respective driveshaft 114a, 114b. As described above with respect to FIGS. 1A and 1B, the access space 150 and gap 152 permit ease of assembly and maintenance of electric drive train system 102.

In the embodiments of FIGS. 3A and 3B, gearset assembly 118a is positioned between the radial flux electric motor 312a and the side frame member 104a. Similarly, the gearset assembly 118b is positioned between the radial flux electric motor 312b and the side frame member 104b. By positioning the gearset assemblies 118a, 118b in these positions, the driveshafts 114a, 114b of radial flux electric motors 312a, 312b, respectively, extend away from the centerline axis 106 of the utility vehicle 100. Additionally, as shown in FIG. 3A, the radial flux electric motor 312a is spaced apart from the side frame member 104b by a gap 320. Similarly, the radial flux electric motor 312b is spaced apart from the side frame member 104a by a gap 330. The gaps 320, 330 extend in a direction that is generally perpendicular to the centerline axis 106 of the utility vehicle 100. The gap 320 and the gap 330 may be the same length or may be different lengths. The gaps 320, 330 may be different lengths if the radial flux electric motors 312a, 312b are different sizes. Additionally, the radial flux electric motors 312a, 312b are spaced apart from each other by a gap 340, which spans along the centerline axis 106 of the utility vehicle 100. In that regard, the gap 340 spans in a direction generally parallel with the centerline axis 106, such that gap 152 and gap 340 at least partially define the access space 150.

The gaps 152, 320, 330, 340 allow for tools (e.g., drills, wrenches, etc.) or people to access the interior of the utility vehicle 1M when installing or maintaining the components of the electric drive train system 102 of the utility vehicle 100. For example, the gearset assemblies 118a, 118b and the radial flux electric motors 312a, 312b may be inserted into the utility vehicle 100 and coupled to their respective side frame members 104a, 104b. The gaps 320, 330 provide clearance space between the gearset assemblies 118a, 118b and the side frame members 104a, 104b, respectively, to reduce the probability of interference between components.

As discussed above with respect to FIG. 1B, in one or more embodiments as shown in FIG. 3B, one or more batteries 154 may be installed in the access space 150 formed by gaps 152, 340 between gearset assemblies 118a, 118b. The opposing gearset assemblies 118a, 118b, being spaced apart from one another to form gap 152 and the opposing radial flux electric motors 312a, 312b, being spaced apart from one another to form gap 340, provide sufficient space for batteries 154 to be installed along centerline axis 106.

As discussed above, the motors 312a, 312b may be radial flux electric motors in some embodiments. In other embodiments, the motors 312a, 312b may be hydraulic motors. However, it will be appreciated that because axial flux motors typically require larger diameters than radial flux motors, axial flux motors would not be suitable for the embodiments of the vehicle shown in FIGS. 3A and 3B because the access space 150 as defined by gaps 152 and 340 could not be established. In any event, the power output of a radial flux electric motor increases as a length of the radial flux electric motor increases. For example, as shown in FIG. 3A, the radial flux electric motors 312a, 312b each have a length L1. FIG. 3B illustrates radial flux electric motors 312a, 312b each having a length L2. The length L2 is greater than the length L1. Therefore, the radial flux electric motors 312a, 312b shown in FIG. 3B output more power than the radial flux electric motors 312a, 312b shown in FIG. 3A. While the lengths of the radial flux electric motors 312a, 312b, may change, the diameter (or width) of the motors may remain the same (as opposed to axial flux motors with where power output increases with diameter). Therefore, the power output of the radial flux electric motors 312a, 312b may be increased by increasing the length of the radial flux electric motors 312a, 312b without increasing the diameter of the radial flux electric motors 312a, 312b. This allows for more powerful motors to be installed in the utility vehicle 100 without reducing the access space 150 defined by gaps 152 and 340. In some alternative embodiments, the width of the individual radial flux electric motors 312a, 312b may also vary.

As shown in FIG. 3B, because the radial flux electric motors 312a, 312b are longer than the radial flux electric motors 312a, 312b of FIG. 3A, the gaps 320, 330 are smaller than in FIG. 3A. Having the gaps 320, 330 allows for motors of varying size to be easily placed and/or swapped out within the utility vehicle 100.

In one or more embodiments, a brake 117 may be disposed to control rotation of driveshaft 114. In some embodiments, brake 117 is mounted on gearbox assembly 118 opposite the radial flux electric motor 312. Thus, in FIGS. 3A and 3B, brake 117a is shown mounted on gearbox assembly 118a opposite radial flux electric motor 312a, and brake 117b is shown mounted on gearbox assembly 118b opposite radial flux electric motor 312b.

While certain embodiments of the present disclosure have been described and shown in the accompanying drawings, it is to be understood that such embodiments are merely illustrative of and not restrictive to the broad disclosed concepts, and that the embodiments of the present disclosure not be limited to the specific constructions and arrangements shown and described, since various other modifications may occur to those ordinarily skilled in the art.

What is claimed is:

1. A utility vehicle comprising:
    a vehicle chassis frame extending along a centerline axis, the vehicle chassis frame having a first side frame member and a second side frame member opposing one another about the centerline axis;
    a first drive mechanism supported by the first side frame member and coupled to a first forward wheel assembly and a first rear wheel assembly disposed along the first side frame member; and
    a second drive mechanism supported by the second side frame member and coupled to a first forward wheel assembly and a first rear wheel assembly disposed along the second side frame member;
    a first gearset assembly including an output shaft coupled to the first drive mechanism;
    a second gearset assembly including an output shaft coupled to the second drive mechanism;
    a first axial flux electric motor coupled to the first gearset assembly and positioned between the first side frame member and the first gearset assembly; and a second axial flux electric motor coupled to the second gearset assembly and positioned between the second side frame member and the second gearset assembly, wherein the first gearset assembly and the second gearset assembly are spaced apart from one another on opposite sides of the centerline axis.

2. The utility vehicle of claim 1, wherein the first axial flux electric motor has a driveshaft extending inwardly towards the centerline axis and wherein the second axial flux electric motor has a driveshaft extending inwardly towards the centerline axis.

3. The utility vehicle of claim 2, wherein the driveshaft of the first axial flux electric motor is coaxial with the driveshaft of the second axial flux electric motor.

4. The utility vehicle of claim 1, wherein each of the first and second drive mechanisms comprise:
a first wheel shaft coupled to a forward wheel assembly;
a second wheel shaft coupled to a rear wheel assembly;
a forward wheel sprocket disposed on the first wheel shaft;
a rear wheel sprocket disposed on the second wheel shaft;
a first output sprocket disposed on the output shaft of the respective first and second gearset assemblies;
a second output sprocket disposed on the output shaft of the respective first and second gearset assemblies;
a forward chain engaging the forward wheel sprocket and the first output sprocket; and
a rear chain engaging the rear wheel sprocket and the second output sprocket.

5. The utility vehicle of claim 1, wherein the first gearset assembly and the second gearset assembly are each a parallel shaft gearset assembly.

6. The utility vehicle of claim 1, further comprising a brake disposed along an output shaft of one of the first and second gearset assemblies.

7. The utility vehicle of claim 1, wherein the first gearset assembly comprises:
an input gear mounted on a driveshaft of the first axial flux electric motor;
a first intermediate gear mounted on an intermediate driveshaft and meshed with the input gear;
a second intermediate gear mounted on the intermediate driveshaft; and
an output gear mounted on the output shaft and meshed with the second intermediate gear.

8. The utility vehicle of claim 1, wherein the spaced apart first and second gearset assemblies define a gap therebetween, the utility vehicle further comprising at least one battery disposed in the gap formed between the first gearset assembly and the second gearset assembly.

9. The utility vehicle of claim 1, wherein the first axial flux electric motor is an alternating current motor, and wherein the second axial flux electric motor is an alternating current motor.

10. A utility vehicle comprising:
a vehicle chassis frame extending along a centerline axis, the vehicle chassis frame having a first side frame member and a second side frame member opposing one another about the centerline axis;
a first forward wheel assembly and a first rear wheel assembly disposed along the first side frame member;
a second forward wheel assembly and a second rear wheel assembly disposed along the second side frame member;
a first gearset assembly supported by the first side frame member, the first gearset assembly including an output shaft;

a first drive mechanism supported by the first side frame member, the first drive mechanism comprising:
a first wheel shaft coupled the first forward wheel assembly;
a second wheel shaft coupled to the first rear wheel assembly;
a forward wheel sprocket disposed on the first wheel shaft of the first drive mechanism;
a rear wheel sprocket disposed on the second wheel shaft of the first drive mechanism;
a first output sprocket disposed on the output shaft of the first gearset assembly; and
a second output sprocket disposed on the output shaft of the first gearset assembly;
a second gearset assembly supported by the second side frame member, the second gearset assembly including an output shaft;
a second drive mechanism supported by the second side frame member, the second drive mechanism comprising:
a first wheel shaft coupled the second forward wheel assembly;
a second wheel shaft coupled to the second rear wheel assembly;
a forward wheel sprocket disposed on the first wheel shaft of the second drive mechanism;
a rear wheel sprocket disposed on the second wheel shaft of the second drive mechanism;
a first output sprocket disposed on the output shaft of the second gearset assembly; and
a second output sprocket disposed on the output shaft of the second gearset assembly;
a first axial flux electric motor positioned between the first side frame member and the first gearset assembly, the first axial flux electric motor having a driveshaft extending towards the centerline axis and coupled to the first gearset assembly; and
a second axial flux electric motor positioned between the second side frame member and the second gearset assembly, the second axial flux electric motor having a driveshaft extending towards the centerline axis and coupled to the second gearset assembly,
wherein the first gearset assembly and the second gearset assembly are spaced apart from one another on opposite sides of the centerline axis to define a gap between the first and second gearset assemblies.

11. The utility vehicle of claim 10, wherein the driveshaft of the first axial flux electric motor is coaxial with the driveshaft of the second axial flux electric motor.

12. The utility vehicle of claim 10, wherein the first gearset assembly and the second gearset assembly are each a parallel shaft gearset assembly.

13. The utility vehicle of claim 12, wherein:
the first gearset assembly comprises:
an input gear mounted on the driveshaft of the first axial flux electric motor;
an output gear mounted on the output shaft of the first gearset assembly;
a first intermediate gear mounted on an intermediate driveshaft and meshed with the input gear of the driveshaft of the first axial flux electric motor; and
a second intermediate gear mounted on the intermediate driveshaft and meshed with the output gear mounted on the output shaft of the first gearset assembly; and
the second gearset assembly comprises:

an input gear mounted on the driveshaft of the second axial flux electric motor;

an output gear mounted on the output shaft of the second gearset assembly;

a first intermediate gear mounted on an intermediate driveshaft and meshed with the input gear of the driveshaft of the second axial flux electric motor; and a second intermediate gear mounted on the intermediate driveshaft and meshed with the output gear mounted on the output shaft of the second gearset assembly.

14. The utility vehicle of claim 10, further comprising a brake disposed along the output shaft or the input shaft of one of the first and second gearset assemblies.

15. The utility vehicle of claim 10, wherein the first gearset assembly and the second gearset assembly are spaced apart from one another on opposite sides of the centerline axis to define an access space therebetween.

16. The utility vehicle of claim 15, further comprising at least two electric batteries disposed in the access space between the first and second gearset assemblies.

17. The utility vehicle of claim 16, wherein the output shafts of the first and second axial flux electric motors extend along an output shaft axis, and wherein the first and second axial flux electric motors are positioned on one side of the output shaft axis and the electric batteries are positioned primarily on the other side of the output shaft axis.

18. A utility vehicle comprising:

a vehicle chassis frame extending along a centerline axis, the vehicle chassis frame having a first side frame member and a second side frame member opposing one another about the centerline axis;

a first drive mechanism supported by the first side frame member and coupled to a wheel assembly disposed along the first side frame member; and a second drive mechanism supported by the second side frame member and coupled to a wheel assembly disposed along the second side frame member;

a first gearset assembly including an output shaft extending along an output shaft axis, the output shaft of the first gearset assembly coupled to the first drive mechanism, the first gearset assembly spaced apart from the centerline axis, wherein the first gearset assembly is a parallel shaft gearset assembly;

a second gearset assembly including an output shaft extending along the output shaft axis, the output shaft of the second gearset assembly coupled to the second drive mechanism, the second gearset assembly spaced apart from the centerline axis and opposing the first gearset assembly to define a first gap therebetween, wherein the second gearset assembly is a parallel shaft gearset assembly;

a first radial flux electric motor coupled to the first gearset assembly on a first side of the output shaft axis, the first radial flux electric motor extending across the centerline axis towards the second side frame member;

a second radial flux electric motor coupled to the second gearset assembly on a second side of the output shaft axis, the second radial flux electric motor extending across the centerline axis towards the first side frame member, the first and second radial flux electric motors spaced apart from one another about the output shaft axis so as to define a second gap between the first and second radial flux electric motors; and at least one electric battery disposed in the gap between the first and second radial flux electric motors.

* * * * *

UNITED STATES PATENT AND TRADEMARK OFFICE
CERTIFICATE OF CORRECTION

| | |
|---|---|
| PATENT NO. | : 12,097,759 B1 |
| APPLICATION NO. | : 18/365544 |
| DATED | : September 24, 2024 |
| INVENTOR(S) | : Ajinkya Dhopaokar and David Kemper |

Page 1 of 1

It is certified that error appears in the above-identified patent and that said Letters Patent is hereby corrected as shown below:

In the Specification

Column 3, Line 41, change "10a" to -- 110a --

Column 3, Line 52, change "11" to -- 111 --

Column 4, Line 3, change "11b" to -- 110b --

Column 6, Line 21, change "18b" to -- 118b --

Column 7, Line 43, change "1M" to -- 100 --

Signed and Sealed this
Twenty-fifth Day of February, 2025

Coke Morgan Stewart
*Acting Director of the United States Patent and Trademark Office*